(12) United States Patent
Nakamura et al.

(10) Patent No.: US 6,465,912 B1
(45) Date of Patent: Oct. 15, 2002

(54) POWER TRANSFER DEVICE

(75) Inventors: Fuminori Nakamura; Shinzo Tamai; Isao Kamiyama; Masatoshi Takeda; Hiroshi Yamamoto; Yuji Kuroda, all of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 41 days.

(21) Appl. No.: 09/656,745

(22) Filed: Sep. 7, 2000

(30) Foreign Application Priority Data

Feb. 2, 2000 (JP) ........................................ 2000-025291

(51) Int. Cl.[7] ................................................. H02B 1/00
(52) U.S. Cl. ............................... 307/72; 307/70; 307/87
(58) Field of Search .............................. 307/70, 85–87, 307/72

(56) References Cited

U.S. PATENT DOCUMENTS

| | | | | |
|---|---|---|---|---|
| 5,111,059 A | * | 5/1992 | Woodworth | 307/87 |
| 5,555,182 A | * | 9/1996 | Galm | 307/87 |
| 5,635,772 A | * | 6/1997 | Lagree et al. | 307/87 |
| 5,808,378 A | * | 9/1998 | O'Leary | 307/87 |
| 5,814,904 A | * | 9/1998 | Galm | 307/85 |

\* cited by examiner

Primary Examiner—Fritz Fleming
(74) Attorney, Agent, or Firm—Leydig, Voit & Mayer, Ltd.

(57) ABSTRACT

A power transfer device includes a first current transferring section connected between a first AC power source and a load, a second current transferring section with first and second switches which have opposite conduction directions, connected in parallel, and connected between a second AC power source and the load; a current detector for detecting a current flowing from the first AC power source to the load; a generator for generating a power transfer signal instructing transfer from the first AC power source to the second AC power source; a current direction estimator for estimating the direction of a current which flows from the first AC power source to the load when the second current transferring section enters the conduction state after a time period; and a conduction signal generator for causing one of the first and second switches to be conductive, so that the current flowing from the first AC power source to the load is cancelled, and, thereafter, causing the other of the first and second switches to be conductive.

9 Claims, 12 Drawing Sheets

POWER TRANSFER DEVICE

BACKGROUND OF THE INVENTION

1. Field of the Invention

The present invention relates to a power transfer device which is connected to AC power sources of different kinds, which normally supplies power from first AC power source to a load, and which, when an abnormality, such as a voltage drop, occurs in the power source, switches to another or second power AC power source so as to continuously supply power to the load.

2. Description of the Related Art

FIG. 12 is a diagram schematically showing the configuration of a conventional power transfer device which disclosed in, for example, U.S. Pat. No. 5,644,175, and FIG. 13 is a flowchart showing a procedure of a transferring operation in the conventional power transfer device shown in FIG. 12.

In FIG. 12, 1a denotes a first AC power source, 1b denotes a second AC power source, and 2 denotes a load which is connected to one of the AC power sources and requested to always operate.

The reference numerals 3a and 3b denote first and second current transfer switches (referred to also as current transferring section) which are connected between the first AC power source 1a and the load 2, and the second AC power source 1b and the load 2 to select an AC power source which supplies a current to the load 2, respectively.

The reference numerals 4a1 and 4a2 denote current directional semiconductor switches such as thyristors which constitute the first current transfer switch 3a, and which do not have self-arc extinguishing properties. The switches are connected in parallel so that their conduction directions are opposed to each other.

Similarly, 4b1 and 4b2 denote current directional semiconductor switches such as thyristors which constitute the second current transfer switch 3b, and which do not have self-arc extinguishing properties. The switches are connected in parallel so that their conduction directions are opposed to each other.

The reference numerals 5a1 and 5a2 denote gate drivers which supply gate signals to the semiconductor switches 4a1 and 4a2 constituting the first current transfer switch 3a, respectively, and 5b1 and 5b2 denote gate drivers which supply gate signals to the semiconductor switches 4b1 and 4b2 constituting the second current transfer switch 3b, respectively.

The reference numerals 6a1, 6a2, 6b1, and 6b2 denote signal switches for switching over an ON signal (conduction signal) and an OFF signal (non-conduction signal) that are to be supplied to the gate drivers 5a1, 5a2, 5b1, and 5b2.

The reference numeral 7 denotes a voltage detector for detecting the voltage of the first AC power source 1a, 8 denotes a power interruption detector for detecting a power interruption of the first AC power source 1a on the basis of the voltage of the AC power source 1a which is detected by the voltage detector 7, and for outputting a power interruption signal, 9 denotes a current detector for detecting a current flowing from the first AC power source 1a to the load 2, and 10 denotes a current direction detector for receiving the power interruption signal from the power interruption detector 8, for detecting the current direction on the basis of the polarity of the current detected by the current detector 9 and flowing from the first AC power source 1a to the load 2, and for causing the signal switches 6b1 and 6b2 to select the ON signal or the OFF signal in accordance with a result of the detection.

The power interruption detector 8 causes the signal switches 6a1 and 6a2 to select the ON signal until a power interruption is detected (i.e., during a period when the first AC power source normally operates in a correct manner), and, when a power interruption is detected, outputs the power interruption signal (i.e., a power transfer signal for transferring from the first AC power source to the second AC power source) to cause the signal switches 6a1 and 6a2 to select the OFF signal.

Next, the operation of the conventional power transfer device will be described.

Referring to FIG. 12 showing the configuration of the conventional power transfer device, in a normal state, the signal switches 6a1 and 6a2 selects the ON signal, the gate drivers 5a1 and 5a2 supply the gate signal to the semiconductor switches 4a1 and 4a2 constituting the first current transfer switch 3a, the semiconductor switches 4a1 and 4a2 are therefore turned ON (enter the conduction state), and the first AC power source 1a is connected to the load 2, so that the power is supplied to the load from the first AC power source 1a.

When an abnormality such as a power interruption occurs in the first AC power source 1a and the voltage applied to the load 2 is lowered, the power interruption detector 8 detects the power interruption on the basis of the voltage drop of the first AC power source 1a which is detected by the voltage detector 7, and generates the power interruption signal.

Upon reception of the power interruption signal output from the power interruption detector 8, the signal switches 6a1 and 6a2 select the OFF signal to cancel the gate signals for the semiconductor switches 4a1 and 4a2 constituting the first current transfer switch 3a.

At this time, since the semiconductor switches 4a1 and 4a2 constituting the first current transfer switch 3a cannot perform self-arc extinguishing, the semiconductor switches 4a1 and 4a2 cannot enter the OFF state (non-conduction state) until the currents of the semiconductor switches 4a1 and 4a2 are reduced to a predetermined current level or lower, and hence the load 2 cannot be disconnected from the power source 1a.

To comply with this, in the conventional power transfer device disclosed in U.S. Pat. No. 5,644,175, the current flowing from the first AC power source 1a is cancelled by a current flowing from the second AC power source 1b which is the sound AC voltage source, whereby the current flowing through the semiconductor switch 4a1 or 4a2 is lowered to the predetermined current level or less which is required for attaining the OFF state, so as to hasten the interrupting operation of the first current transfer switch 3a.

Furthermore, at the timing when the first current transfer switch 3a is interrupted, the second current transfer switch 3b has been already turned ON, and hence the time period when the voltage applied to the load 2 is low can be shortened.

The operation procedure of the conventional power transfer device will be described with reference to the flowchart of FIG. 13.

In the following description, it is assumed that the direction of the current which is flowing from the first AC power source 1a to the load 2 at the occurrence of the power interruption coincides with that of the arrow shown above the current detector 9 in FIG. 12.

When a power interruption occurs in the first AC power source 1a (step 1 of FIG. 13) and the voltage of the first AC power source 1a detected by the voltage detector 7 is lowered, the power interruption detector 8 detects the power interruption (step 2 of FIG. 13), and then generates the power interruption signal.

In response to the power interruption signal generated by the power interruption detector 8, the signal switches 6a1 and 6a2 switch over from the ON signal to the OFF signal, and the gate signals generated by the gate drivers 5a1 and 5a2 are cancelled (step 3 of FIG. 13).

In response to the cancellation of the gate signals, the semiconductor switches 4a1 and 4a2 constituting the first current transfer switch 3a enter a state where the switches can be turned OFF at any time. Since the semiconductor switches 4a1 and 4a2 are semiconductor elements which cannot perform self-arc extinguishing, however, the semiconductor switch 4a1 through which the current is flowing continues to be in the ON state until the current is reduced to a fixed current level or less, although the semiconductor switch 4a2 having the current directionality which is opposite to the current flowing from the first AC power source 1a to the load 2 is immediately turned OFF.

After the gate signals of the gate drivers 5a1 and 5a2 are cancelled, the current direction detector 10 detects, for the second time, the current direction from the current detected by the voltage detector 7 (step 4 of FIG. 13). If the detected current directions detected both the first and second times coincide with each other, the current direction detector gives a signal to the signal switches 6b1 and 6b2 so that the gate drivers 5b1 and 5b2 generate gate signals which cause the semiconductor switch 4b1 of the second current transfer switch 3b to be turned OFF, and the semiconductor switch 4b2 to be turned ON, respectively.

When the gate drivers 5b1 and 5b2 receive the signals from the signal switches 6b1 and 6b2, the gate drivers first cause only the semiconductor switch 4b2 to be turned ON (step 5 of FIG. 13). When the voltage of the second AC power source 1b is higher than that of the load 2, a current flows from the second AC power source 1b into the load 2. As a result, the current flowing from the first AC power source 1a into the load 2 is cancelled, so that the interruption of the semiconductor switch 4a1 (i.e., the turning OFF of the first current transfer switch 3a) can be hastened (step 6 of FIG. 13).

Thereafter, the other semiconductor switch 4b1 of the second current transfer switch 3b is turned ON (step 7 of FIG. 13), whereby the power transferring operation from the first AC power source 1a to the second AC power source 1b is completed (step 8 of FIG. 13).

In the operation, the current direction detector 10 detects the current direction twice, and, if the detected current directions detected both times coincide with each other, the current direction detector gives the ON and OFF signals to the semiconductor switches of the second current transfer switch 3b, because of the following reason. When the current direction is accidentally inverted after the current direction is once detected, the first current transfer switch 3a and the second current transfer switch 3b cause the first AC power source 1a and the second AC power source 1b to be short-circuited.

The semiconductor switch 4b2 only is turned ON because of the following reason. When the semiconductor switch 4b1 is turned ON under a state where the semiconductor switch 4a1 is turned ON, the first AC power source 1a and the second AC power source 1b are short-circuited.

As described above, when an abnormality such as a power interruption occurs in the first AC power source, the conventional power transfer device shown in FIG. 12 operates in the following manner to transfer from the first AC power source 1a to the second AC power source 1b. First, the gate signals for the semiconductor switches 4a1 and 4a2 constituting the first current transfer switch 3a are cancelled. The direction of the current flowing from the first AC power source 1a to the load 2 is detected twice. If the detected current directions coincide with each other, among the semiconductor switches constituting the second current transfer switch 3b, only the semiconductor switch of the polarity in which the current flowing from the first AC power source 1a to the load 2 is cancelled is turned ON, whereby the first AC power source 1a is rapidly interrupted while preventing the power sources from being short-circuited, so that the time period when the voltage applied to the load 2 is low can be shortened.

The conventional power transfer device is configured as described above, and has an advantage that the power sources are prevented from being short-circuited. However, the device has a problem that, when the current direction is accidentally inverted after the current direction detection, the semiconductor switch of the direction in which the first AC power source 1a and the second AC power source 2a are short-circuited is turned ON, thereby causing the first AC power source 1a and the second AC power source 2a to be short-circuited.

In the conventional power transfer device shown in FIG. 12, the first current transfer switch 3a which normally operates is configured by the semiconductor switches 4a1 and 4a2. However, the semiconductor switches generate a conduction loss, and hence the efficiency is poor, thereby increasing the running cost.

In order to dissipate the thermal energy due to the loss, a cooling structure is required, thereby producing a problem that the size of the device is increased.

SUMMARY OF THE INVENTION

It is an object of the invention to solve the above problems and to provide a power transfer device which, when a voltage abnormality is caused by occurrence of an abnormality such as power interruption in a first power source that normally operates, can rapidly transfer to a second power source while preventing the power sources from being short-circuited, and also a power transfer device in which the loss of a current transfer switch is small, and the efficiency is higher, and which can be miniaturized.

It is another object of the invention to provide a power transfer device which, even when a power transfer signal is generated by a manual operation or the like, can rapidly transfer to a second power source while preventing power sources from being short-circuited, and also a power transfer device in which the loss of a current transfer switch is small, and the efficiency is higher, and which can be miniaturized.

According to a aspect of the invention, there is provided a power transfer device of the invention comprises:

a first current transferring section, connected between a first AC power source and a load, for causing a current supply to the load to be in a conduction state or a non-conduction state;

a second current transferring section, connected between a second AC power source and the load, for causing a current supply to the load to be in a conduction state or a non-conduction state, the second current transferring section being configured by switches which have opposite conduction directions, respectively, which are connected in parallel, and which have first and second current directionalities, respectively;

a current detector for detecting a current which is supplied from the first AC power source to the load, and for outputting a detection signal;

a power transfer signal generator for generating a power transfer signal instructing transfer from the first AC power source to the second AC power source, the power transfer signal setting the first current transferring section to enter the non-conduction state;

a current direction estimator for, on the basis of output signals of the power transfer signal generator and the current detector, estimating a direction of a current which flows from the first AC power source to the load at a timing when the second current transferring section becomes conductive after an elapse of a preset time period; and a conduction signal generator for, on the basis of a result of the estimation of the current direction estimator, first causing one of the switches constituting the second current transferring section and respectively having the first and second current directionalities to be conductive, a conduction direction of the one switch coinciding with a direction along which the current flowing from the first AC power source to the load is cancelled, and thereafter causing another one of the switches to be conductive.

The power transfer signal generator of the power transfer device of the invention is power source abnormality detector for detecting an abnormality of the first AC power source, and uses an output signal of the power source abnormality detector as the power transfer signal.

The power source abnormality detector of the power transfer device of the invention is power interruption detector for detecting a power interruption of the first AC power source.

The power transfer signal generator of the power transfer device of the invention generates the power transfer signal in response to a manual operation.

The first current transferring section of the power transfer device of the invention is a non-directional switch.

According to another aspect of the invention, there is provided a power transfer device of the invention comprises:

a first current transferring section which is connected between a first AC power source and a load, and which consists of a non-directional switch that causes a current supply to the load to be in a conduction state or a non-conduction state;

a second current transferring section, connected between a second AC power source and the load, for causing a current supply to the load to be in a conduction state or a non-conduction state, the second current transferring section being configured by switches which have opposite conduction directions, respectively, which are connected in parallel, and which have first and second current directionalities, respectively;

a current detector for detecting a value of a current which is supplied from the first AC power source to the load, and for outputting the current value;

a power transfer signal generator for generating a power transfer signal instructing transfer from the first AC power source to the second AC power source, the power transfer signal setting the first current transferring section to enter the non-conduction state; and a current direction detector for, on the basis of the power transfer signal and an output signal of the current detector, detecting a direction of the current flowing from the first AC power source to the load, and for, on the basis of the detected current direction, first causing one of the switches constituting the second current transferring section and respectively having the first and second current directionalities to be conductive, a conduction direction of the one switch coinciding with a direction along which the current flowing from the first AC power source to the load is cancelled, and thereafter causing another one of the switches to be conductive.

DETAILED DESCRIPTION OF THE PRESENT INVENTION

Figure 1:
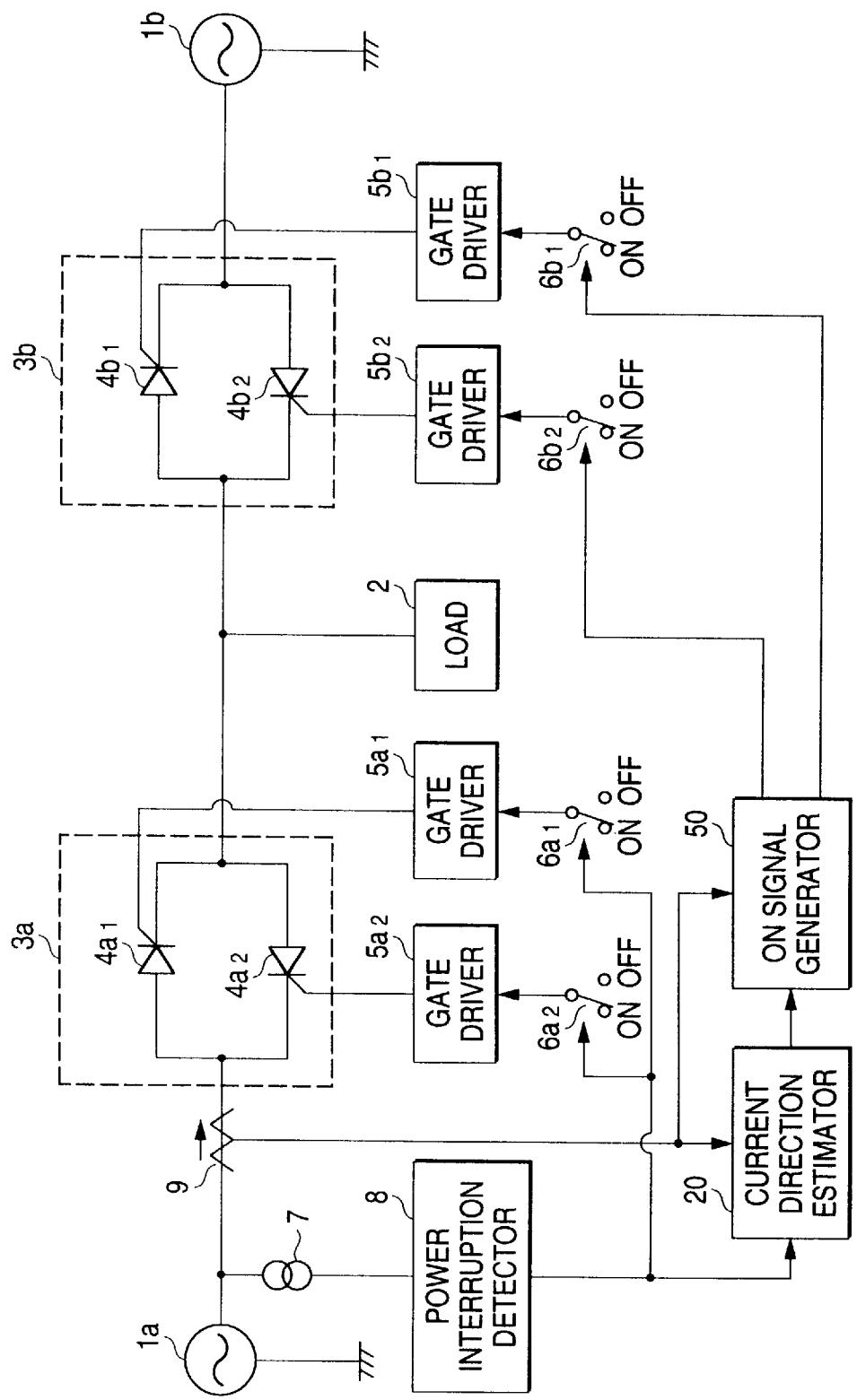
FIG. 1 is a diagram showing the configuration of a power transfer device of Embodiment 1.

Hereinafter, embodiments of the invention will be described with reference to the accompanying drawings. The same reference numerals as those used in the description of the conventional art denote identical or equivalent components of the conventional art.

Embodiment 1

FIG. 1 is a diagram schematically showing the configuration of a power transfer device of Embodiment 1.

In the FIG., $1a$ denotes a first AC power source, $1b$ denotes a second AC power source, 2 denotes a load which is connected to one of the AC power sources and requested to always operate, and $3a$ and $3b$ denote first and second current transfer switches which are connected between the first AC power source $1a$ and the load 2, and the second AC power source $1b$ and the load 2 to select an AC power source which supplies a current to the load 2, respectively.

When the first current transfer switch $3a$ is in the conduction state (ON) and the second current transfer switch $3b$ is in the non-conduction state (OFF), the first AC power source $1a$ is selected to supply a current to the load 2, and, when the first current transfer switch $3a$ is in the non-conduction state (OFF) and the second current transfer switch $3b$ is in the conduction state (ON), the second AC power source $1b$ is selected to supply a current to the load 2.

The reference numerals $4a1$ and $4a2$ denote semiconductor switches such as thyristors which constitute the first current transfer switch 3a, and which do not have self-arc extinguishing properties. The switches are connected in parallel so that their conduction directions are opposed to each other.

Similarly, 4b1 and 4b2 denote semiconductor switches such as thyristors which constitute the second current transfer switch 3b, and which do not have self-arc extinguishing properties. The switches are connected in parallel so that their conduction directions are opposed to each other.

The reference numerals 5a1 and 5a2 denote gate drivers which supply gate signals to the semiconductor switches 4a1 and 4a2 constituting the first current transfer switch 3a, respectively, and 5b1 and 5b2 denote gate drivers which supply gate signals to the semiconductor switches 4b1 and 4b2 constituting the second current transfer switch 3b, respectively.

The reference numerals 6a1, 6a2, 6b1, and 6b2 denote signal switches for switching over an ON signal (conduction signal) and an OFF signal (non-conduction signal) that are to be supplied to the gate drivers 5a1, 5a2, 5b1, and 5b2.

The reference numeral 7 denotes a voltage detector for detecting the voltage of the first AC power source 1a, 8 denotes a power interruption detector for detecting a power interruption of the first AC power source 1a on the basis of the voltage of the AC power source 1a which is detected by the voltage detector 7, and for outputting a power interruption signal, and 9 denotes a current detector for detecting a current flowing from the first AC power source 1a to the load 2.

The power interruption detector 8 causes the signal switches 6a1 and 6a2 to select the ON signal until a power interruption is detected (i.e., during a period when the first AC power source normally operates in a correct manner), and, when a power interruption is detected, outputs the power interruption signal to cause the signal switches 6a1 and 6a2 to select the OFF signal.

The power interruption signal output from the power interruption detector is used as a power transfer signal for transferring the power source from the first AC power source to the second AC power source.

The reference numeral 20 denotes a current direction estimator which receives the power interruption signal output from the power interruption detector 8 and an output signal of the current detector 9. By using the value and the gradient of the current flowing through the first current transfer switch 3a at the timing when the current detector 9 detects the current, the current direction estimator estimates the direction of the current flowing through the first current transfer switch 3a at the timing when one of the semiconductor switches (i.e., one of the semiconductor switches 4b1 and 4b2) of the second current transfer switch 3b is actually first turned ON.

The reference numeral 50 denotes an ON signal generator for receiving output signals of the current direction estimator 20 and the current detector 9, and for switching over the signal switches 6b1 and 6b2 so that the gate drivers 5b1 and 5b2 generate gate signals which cause the semiconductor switches 4b1 and 4b2 constituting the second current transfer switch 3b to be sequentially turned ON at predetermined timings.

In the above-mentioned current direction estimator 20, the direction of the current which flows through the first current transfer switch 3a at the timing when one of the semiconductor switches (i.e., one of the switches 4b1 and 4b2) of the second current transfer switch 3b is actually first turned ON is estimated by using the value and the gradient of the current flowing through the first current transfer switch 3a at the timing when the current detector 9 detects the current. Alternatively, estimator for performing estimation on the basis of information such as the kind of the load, the power source voltage, and the phase, or for performing estimation on the basis of the periodicity of the current waveform may be used. Also in the alternative, the same effects can be attained.

Figure 2:
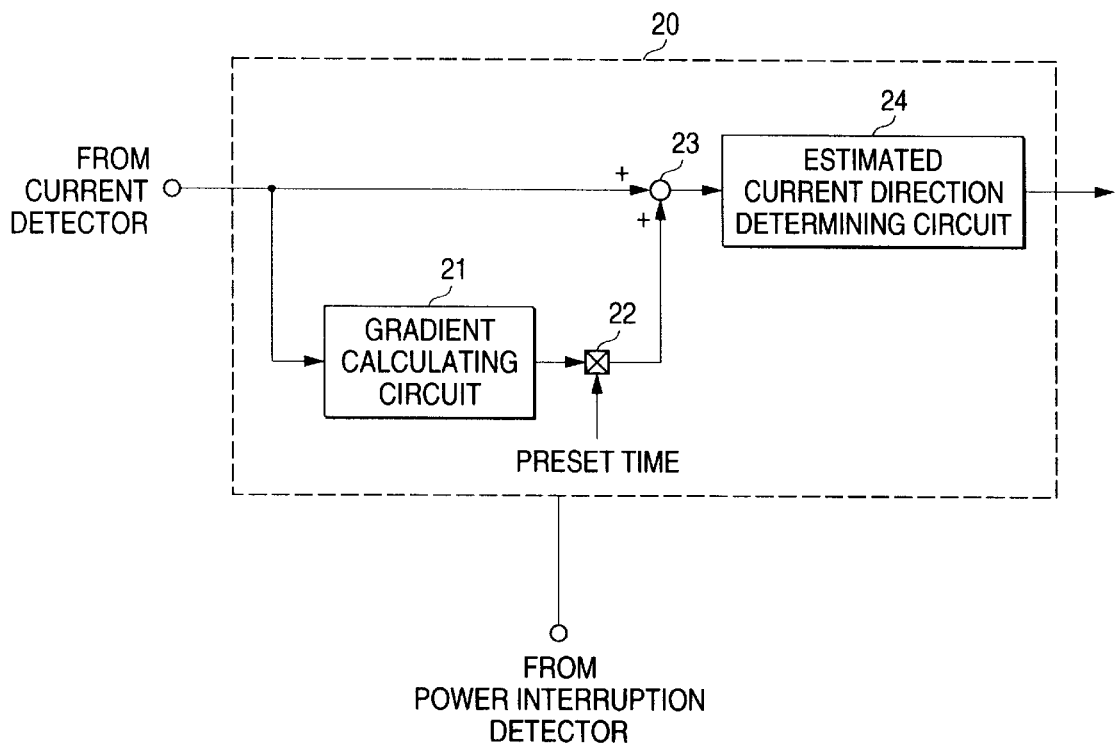
FIG. 2 is a diagram showing a configuration example of a current direction estimator.

FIG. 2 is a diagram showing a specific configuration example of the current direction estimator 20 which is a characteristic component of the embodiment.

In FIG. 2, 21 denotes a gradient calculating circuit which calculates the gradient of an input signal (i.e., a signal corresponding to the current which is detected by the current detector 9, and which flows from the AC power source 1a to the load 2), 22 denotes a multiplying circuit which performs a multiplication on the input signal, 23 denotes an adding circuit which performs an addition on the input signal, and 24 denotes an estimated current direction determining circuit which determines the estimated current direction.

Figure 3:
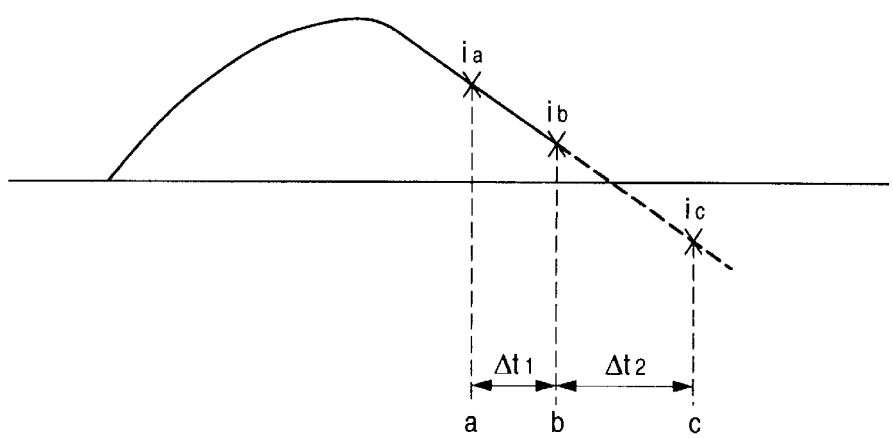
FIG. 3 is a chart showing the waveform of a current detected by a current detector.
Figure 4:
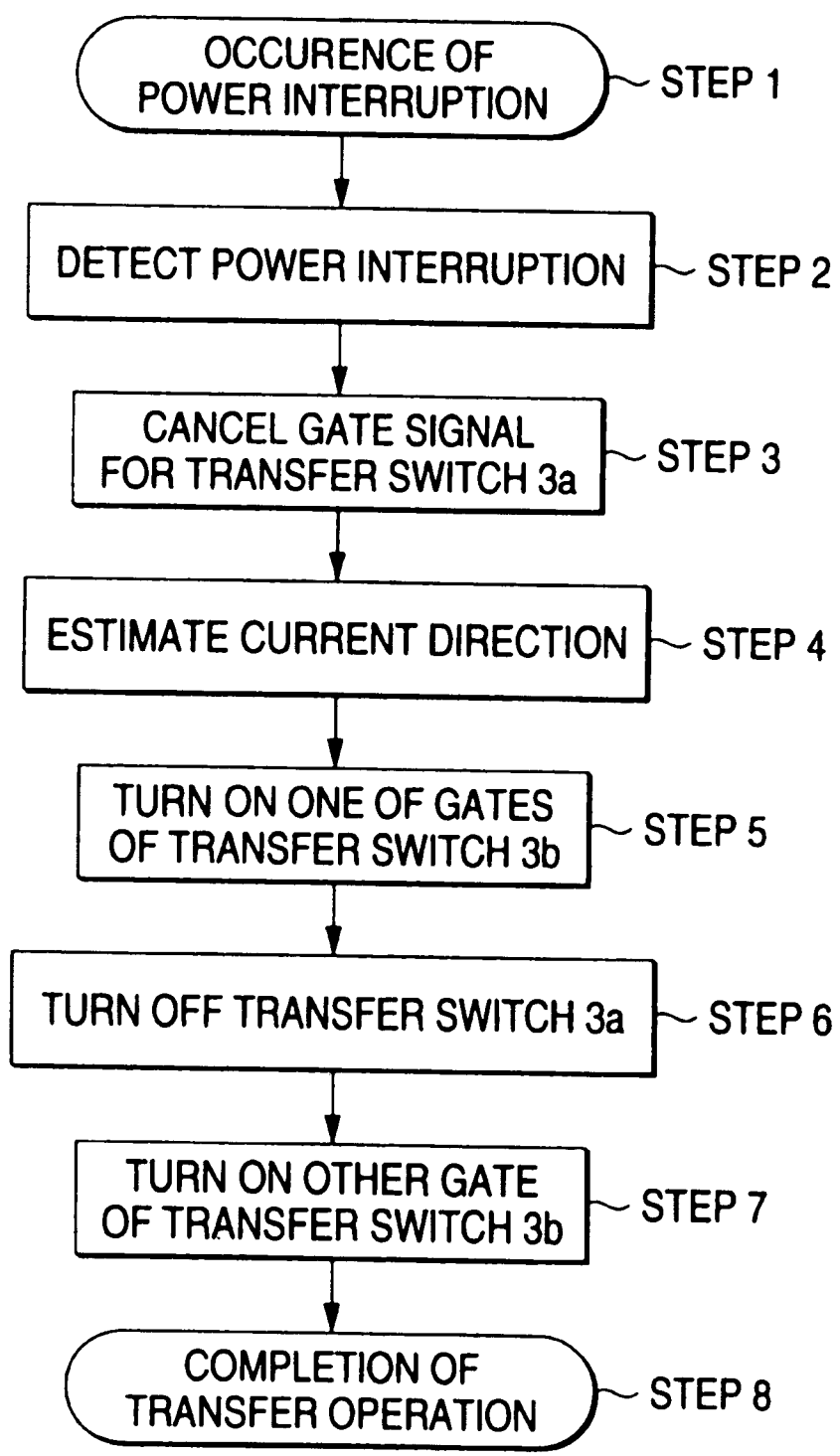
FIG. 4 is a flowchart illustrating the operation of the power transfer device of Embodiment 1.

FIG. 3 is a waveform chart of the current detected by the current detector 9, and FIG. 4 is a flowchart showing a procedure of a power transferring operation in the embodiment.

Figure 5:
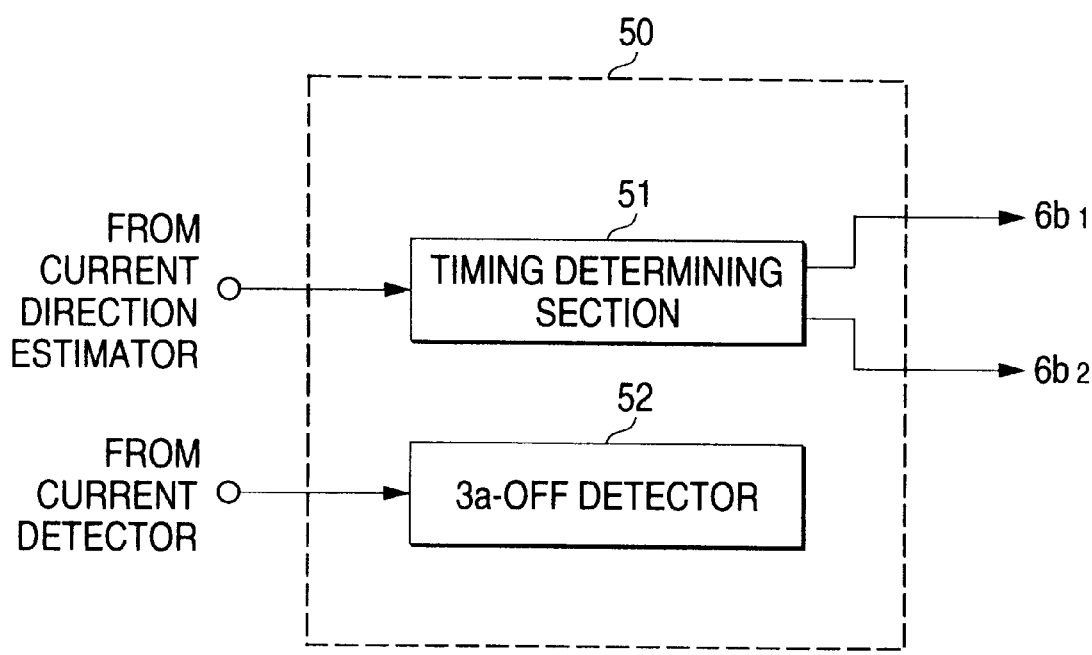
FIG. 5 is a diagram schematically showing a configuration example of an ON signal generator.

FIG. 5 is a diagram schematically showing the configuration of the ON (conduction) signal generator 50.

Next, the operation of the power transfer device of Embodiment 1 will be described with reference to FIGS. 1 to 5.

In the power transfer device shown in FIG. 1, in a normal state (i.e. when the first AC power source correctly operates), both the signal switches 6a1 and 6a2 select the ON signal, the gate drivers 5a1 and 5a2 supply the gate signals to the semiconductor switches 4a1 and 4a2 constituting the first current transfer switch 3a to turn ON (conduction) the first current transfer switch 3a, and the power is supplied from the first power source 1a to the load 2.

At this timing, both the signal switches 6b1 and 6b2 select the OFF signal (non-conduction signal). Therefore, the gate drivers 5b1 and 5b2 do not supply the gate signals to the semiconductor switches 4b1 and 4b2, the second current transfer switch 3b is turned OFF, and the second AC power source 1b is in the state where it is disconnected from the load 2.

When a power interruption (including an abnormal voltage drop) occurs in the first AC power source 1a (step 1 of FIG. 4), the power interruption detector 8 detects the power interruption on the basis of the voltage detected by the voltage detector 7 (step 2 of FIG. 4), and then generates the power interruption signal.

At this timing, the second AC power source 1b is the sound AC voltage source in which a power interruption or the like is not occurring.

Based on the power interruption signal generated by the power interruption detector 8, the signal switches 6a1 and 6a2 output to the gate drivers 5a1 and 5a2 the OFF signal for turning OFF the semiconductor switches 4a1 and 4a2 constituting the first current transfer section 3a.

In response to the cancellation of the gate signals from the gate drivers 5a1 and 5a2 (step 3 of FIG. 4), the semiconductor switches 4a1 and 4a2 enter a state where the switches can be turned OFF at any time.

Since both the semiconductor switches 4a1 and 4a2 are semiconductor elements which cannot perform self-arc extinguishing, however, the semiconductor switch 4a1 through which the current is flowing continues to be in the ON state until the current is reduced to a fixed current level or less, although the semiconductor switch 4a2 having the polarity which is opposite to that of the current flowing from the first AC power source 1a to the load 2 is immediately turned OFF. The above operation is identical with that of the conventional power transfer device shown in FIG. 12.

The power transfer device of Embodiment 1 of the invention is characterized in that, when an abnormality such as a power interruption occurs in the first AC power source 1a and the power source is to be transferred from the first AC power source 1a to the second AC power source 1b, the direction of the current flowing through the first current transfer switch 3a at the timing when the semiconductor switch 4b1 or 4b2 constituting the second current transfer switch 3b is actually turned ON is correctly estimated, and the device operates so that the first AC power source 1a and the second AC power source 1b are prevented from being short-circuited, and the power transfer device itself is prevented from failing, whereby an adverse effect due to a voltage drop is prevented from being produced in another customer.

Next, the operation of the current direction estimator 20 will be described with reference to FIG. 2 which is a diagram of the current direction estimator 20, and FIG. 3 which is a waveform chart of the current detected by the current detector 9.

Hereinafter, a case where a power interruption occurs will be described as a typical example of an abnormality which occurs in the first AC power source 1a.

The current direction estimator 20 receives the power interruption signal (i.e., a signal indicative of an abnormality in the first AC power source 1a) generated by the power interruption detector 8 which serves as abnormality detector for the first AC power source 1a, and then starts the following operation.

First, the gradient calculating circuit 21 calculates the current gradient on the basis of the current value (current waveform) which is input from the current detector 9, and which is shown in FIG. 3.

For example, the current gradient can be calculated by storing a current value ia at time a in FIG. 3, subtracting the current value ia from a current value ib at time b when a power interruption occurs (an abnormality occurs), and dividing the subtraction result by a time difference $\Delta t1$ between the times b and a.

In other words, the current gradient can be calculated by performing a calculation of $(ib-ia)/\Delta t1$.

Alternatively, the current gradient may be obtained by a method using differential member or the like, in place of the above method.

The calculated current gradient is multiplied by the multiplier 22 with a preset time $\Delta t2$ which is to elapse after the estimation of the current direction and before the gate signal is actually applied. In the adder 23, the multiplication result is added to the current ib at time b. As a result, an estimated value of the current ic at the timing (time c) when the gate signal is actually applied is obtained in accordance with the following expression:

$$ic=ib+[\Delta t2*(ib-ia)/\Delta t1].$$

Based on the estimated current value, the estimated current direction determining section 24 determines the current direction, and the current direction at the timing when the gate is actually turned ON is correctly estimated.

The subsequent operation is identical with that of the conventional power transfer device described above. In accordance with the current direction estimated by the current direction estimator 20, only the signal switch 6b2 selects the ON signal (i.e., the signal switch 6b1 remains to be in the state where the OFF signal is selected). In response to the outputs of the signal switches 6b1 and 6b2, the gate drivers 5b1 and 5b2 supply the gate signals to the semiconductor switches 4b1 and 4b2. As a result, first, the semiconductor switch 4b2 is turned ON (step 5 of FIG. 4).

When the voltage of the second AC power source 1b is higher than that of the load 2, the turning ON of the semiconductor switch 4b2 of the second current transfer switch 3b causes a current to flow from the second AC power source 1b into the load 2. As a result, the current flowing from the first AC power source 1a into the load 2 is cancelled, so that the interruption of the semiconductor switch 4a1 (i.e., the interruption of the first current transfer switch 3a) can be hastened (step 6 of FIG. 4). Thereafter, the other semiconductor switch 4b1 of the second current transfer switch 3b is turned ON (step 7 of FIG. 4), whereby the power transferring operation from the first AC power source 1a to the second AC power source 1b is completed (step 8 of FIG. 4).

The operation from steps 5 to 8 of FIG. 4 will be described with reference to FIGS. 1, 2, and 5.

In response to the output signals of the current direction estimator 20 and the current detector 9, the ON signal generator 50 shown in FIG. 5 judges which one of the semiconductor switches 4b1 and 4b2 of the second current transfer switch 3b should be first turned ON. In this case, the ON signal generator outputs a signal so that the signal switch 6b2 selects the ON signal in order to first turn ON the semiconductor switch 4b2.

In accordance with an output signal of ON timing determining section 51 in the ON signal generator 50, the signal switch 6b2 supplies the ON signal to the gate driver 5b2, and the semiconductor switch 4b2 is first turned ON.

When the semiconductor switch 4b2 is turned ON, the current flowing through the semiconductor switch 4a1 is cancelled, and the semiconductor switch 4a1 is turned OFF.

The turning OFF of the semiconductor switch 4a1 results in that the first current transfer switch 3a is completely turned OFF, whereby also the current flowing from the first AC power source 1a to the load 2 is reduced to zero. Therefore, also the current detected by the current detector 9 becomes zero, so that the OFF state of the first current transfer switch 3a can be detected by 3a-OFF detector 52.

The ON timing determining section 51 receives an output signal of the 3a-OFF detector 52, and then causes the signal switch 6b1 to select the ON signal in order to turn ON the remaining semiconductor switch 4b1 of the second current transfer switch 3b. The signal switch 6b1 outputs the ON signal to the gate driver 5b1, and the semiconductor switch 4b1 is then turned ON, thereby completing the transfer operation.

Figure 6:
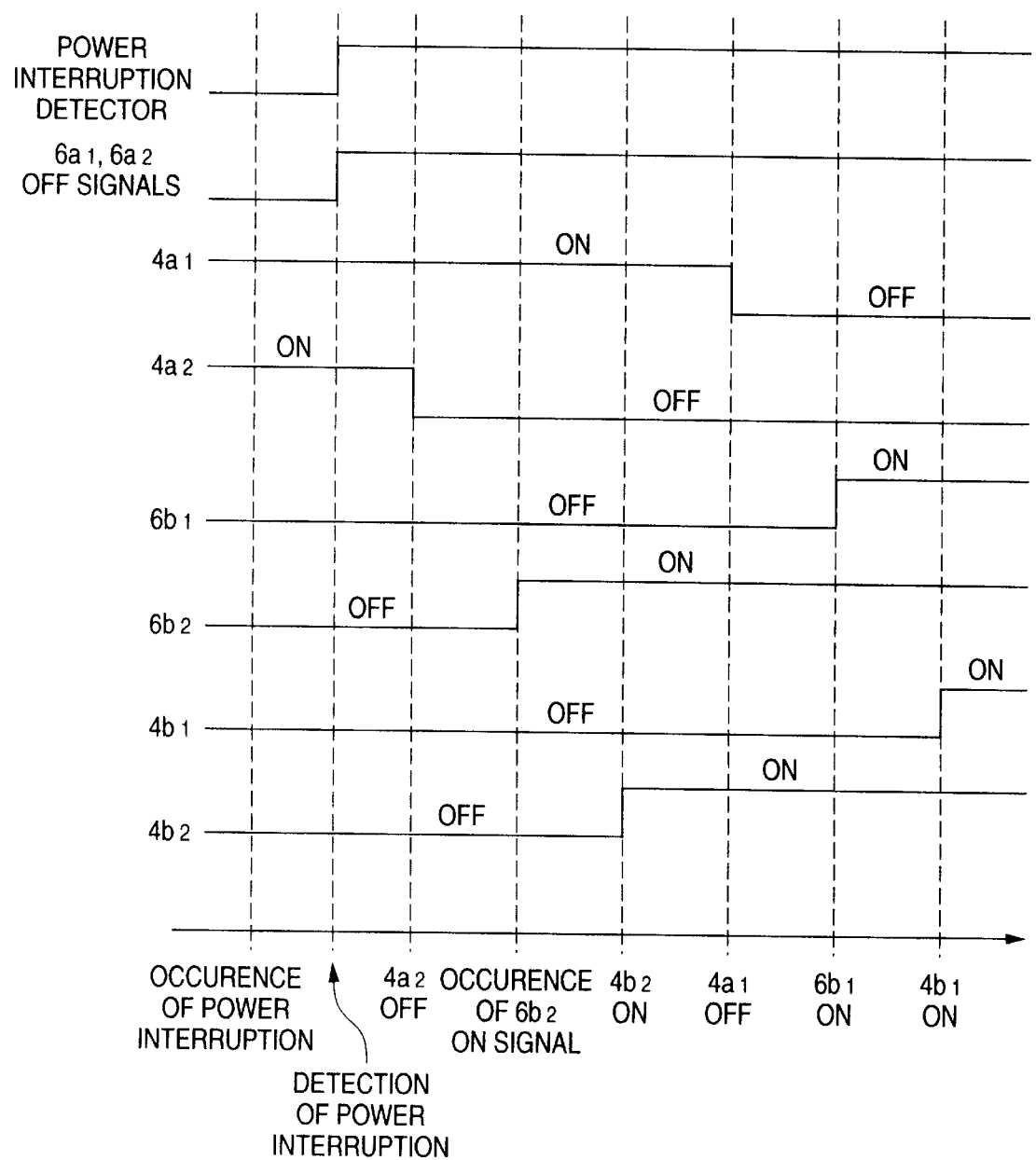
FIG. 6 is a chart showing ON/OFF timings in various portions after occurrence of a power interruption.

FIG. 6 shows sequential timings in the embodiment during the period from the occurrence of an abnormality (for example, a power interruption) in the first AC power source 1a to the timing when the semiconductor switches 4b1 and 4b2 of the second current transfer switch 3b are turned ON and the power source is transferred to the second AC power source 1b.

As described above, when an abnormality such as a power interruption occurs in the first AC power source 1a, the power transfer device of Embodiment 1 shown in FIG. 1 operates in the following manner to transfer from the first AC power source to the second AC power source 1b which is sound. First, the gate signals for the semiconductor switches 4a1 and 4a2 having a current directionality and constituting the first current transfer switch (current transferring section) 3a connected between the first AC power source 1a and the load 2 are cancelled. The current direction estimator 20 correctly estimates the current direction at the timing when the second current transfer switch (current transferring section) 3b actually turns ON the gate. In the second current transfer switch (current transferring section) 3b connected between the second AC power source 1b and the load 2, the semiconductor switch of the conduction direction along which the current flowing from the first AC power source 1a to the load 2 is cancelled is first turned ON, whereby the first AC power source 1a can be rapidly interrupted while preventing the first AC power source 1a and the second AC power source 1b from being short-circuited, and the power source can be transferred to the second AC power source 1b which is sound, while shortening the time period when the voltage applied to the load 2 is low.

In Embodiment 1, the power transferring operation in the case where an abnormality due to a power interruption of the first AC power source 1a is detected has been described. In a power transfer device of this kind, a similar power transferring operation is required also in abnormalities of a power source such as occurrence of an overvoltage, a phase jump, a frequency abnormality, and phase unbalance. In place of the power interruption detector 8, therefore, an overvoltage detector for detecting an overvoltage, a phase jump detector for detecting a phase jump, a frequency abnormality detector for detecting a frequency abnormality, a phase unbalance detector for detecting unbalance of phases, and the like may be disposed. Also in this case, the same effects can be attained.

In Embodiment 1, semiconductor switches such as thyristors are used as current directional switches constituting the first current transfer switch 3a or the second current transfer switch 3b. Switches of any kind may be used as current directional switches constituting the first current transfer switch 3a or the second current transfer switch 3b, as far as the switches have a current directionality, and not be restricted to semiconductor switches.

Embodiment 2

Figure 7:
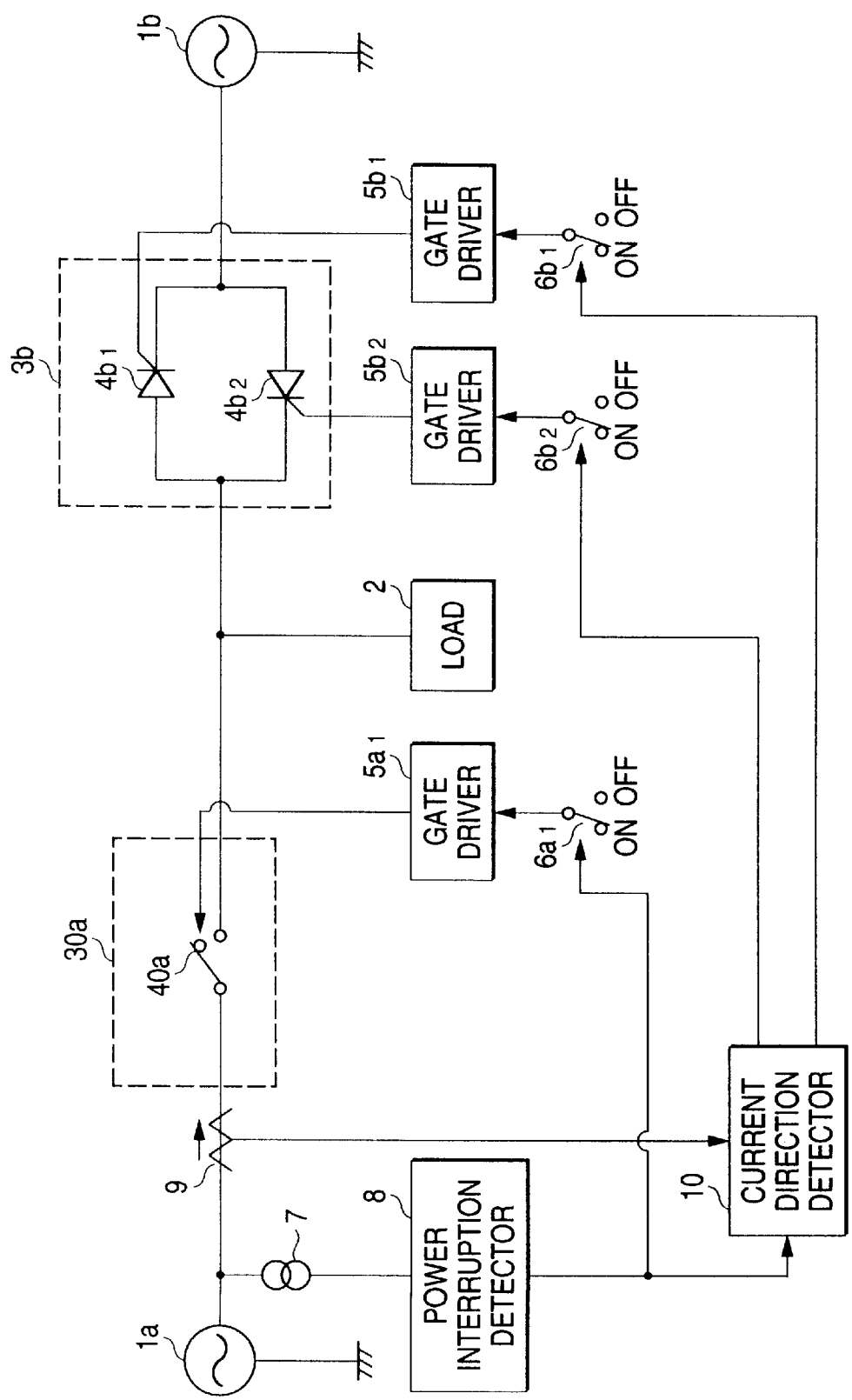
FIG. 7 is a diagram showing the configuration of a power transfer device of Embodiment 2.

FIG. 7 is a diagram schematically showing the configuration of a power transfer device of Embodiment 2 of the invention.

In FIG. 7, 30a denotes a first current transfer switch (transferring section) formed by a non-directional switch 40a such as a vacuum switch or a mechanical switch which does not have a current directionality, and which can perform interruption at only a current zero crossing.

Figure 12:
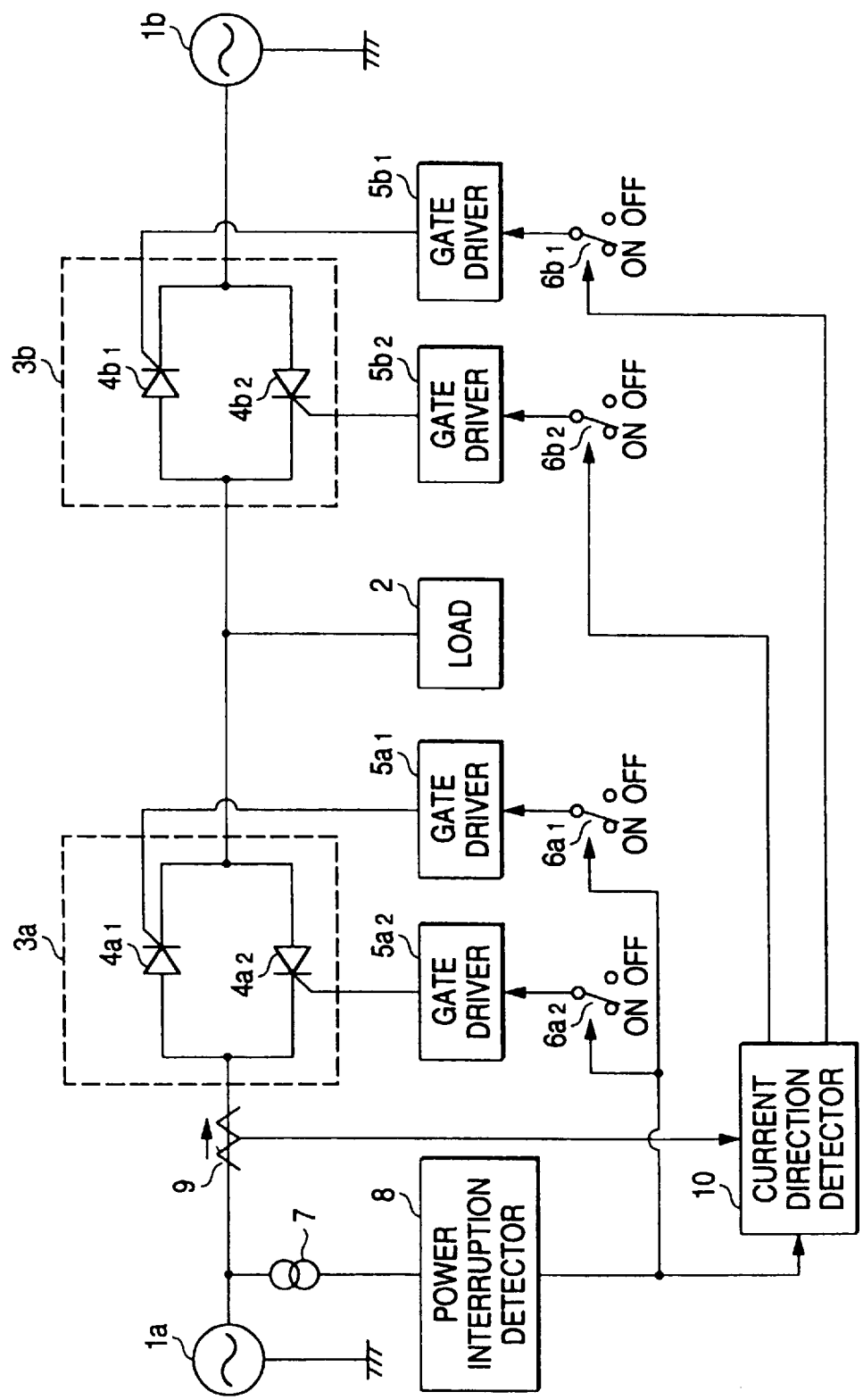
FIG. 12 is a diagram showing the configuration of a power transfer device of the conventional art.
Figure 13:
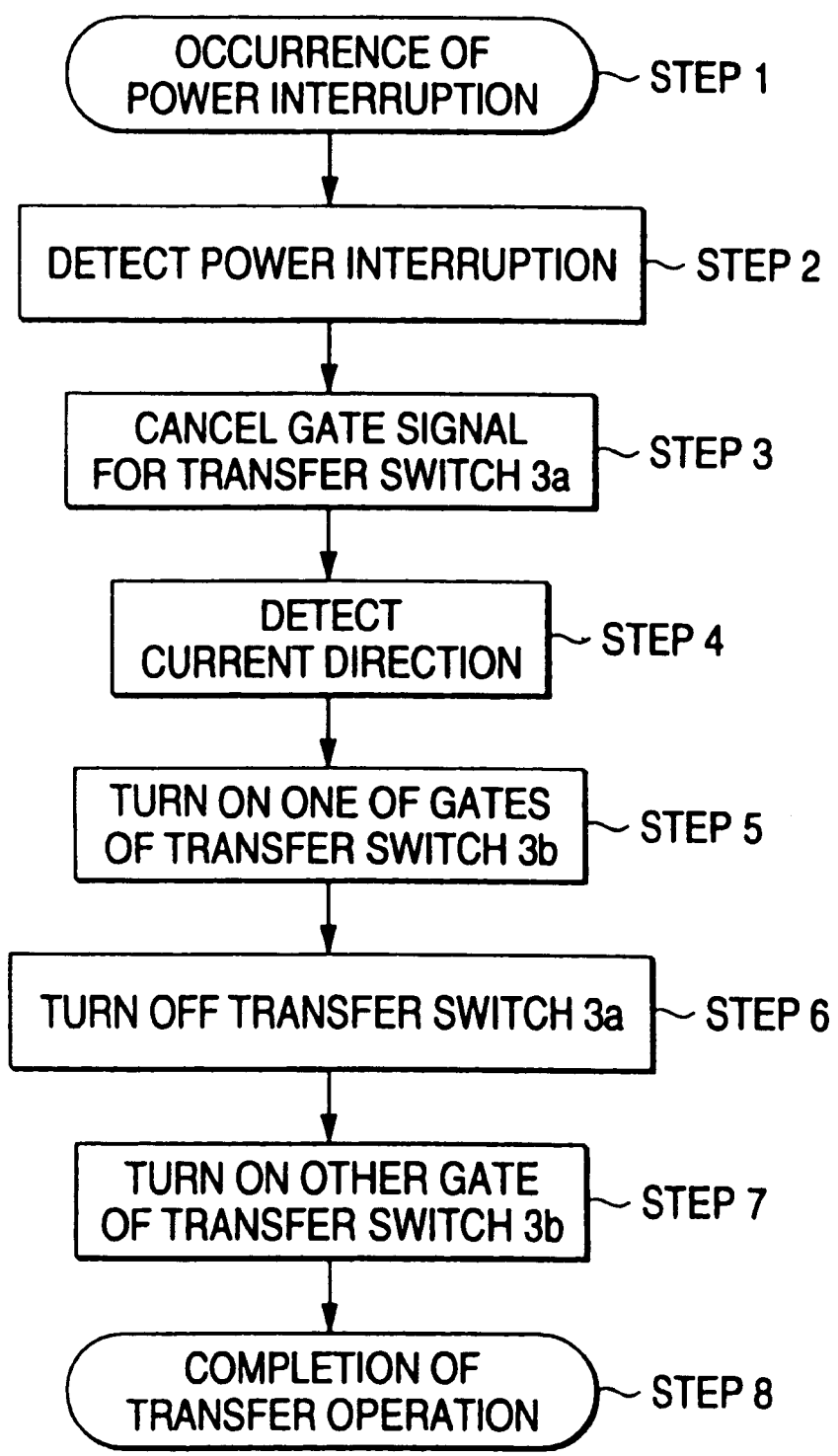
FIG. 13 is a flowchart illustrating the operation of the power transfer device of the conventional art.

The embodiment is different from the conventional power transfer device shown in FIG. 12 in that the first current transfer switch 30a is configured by the non-directional switch 40a.

Figure 8:
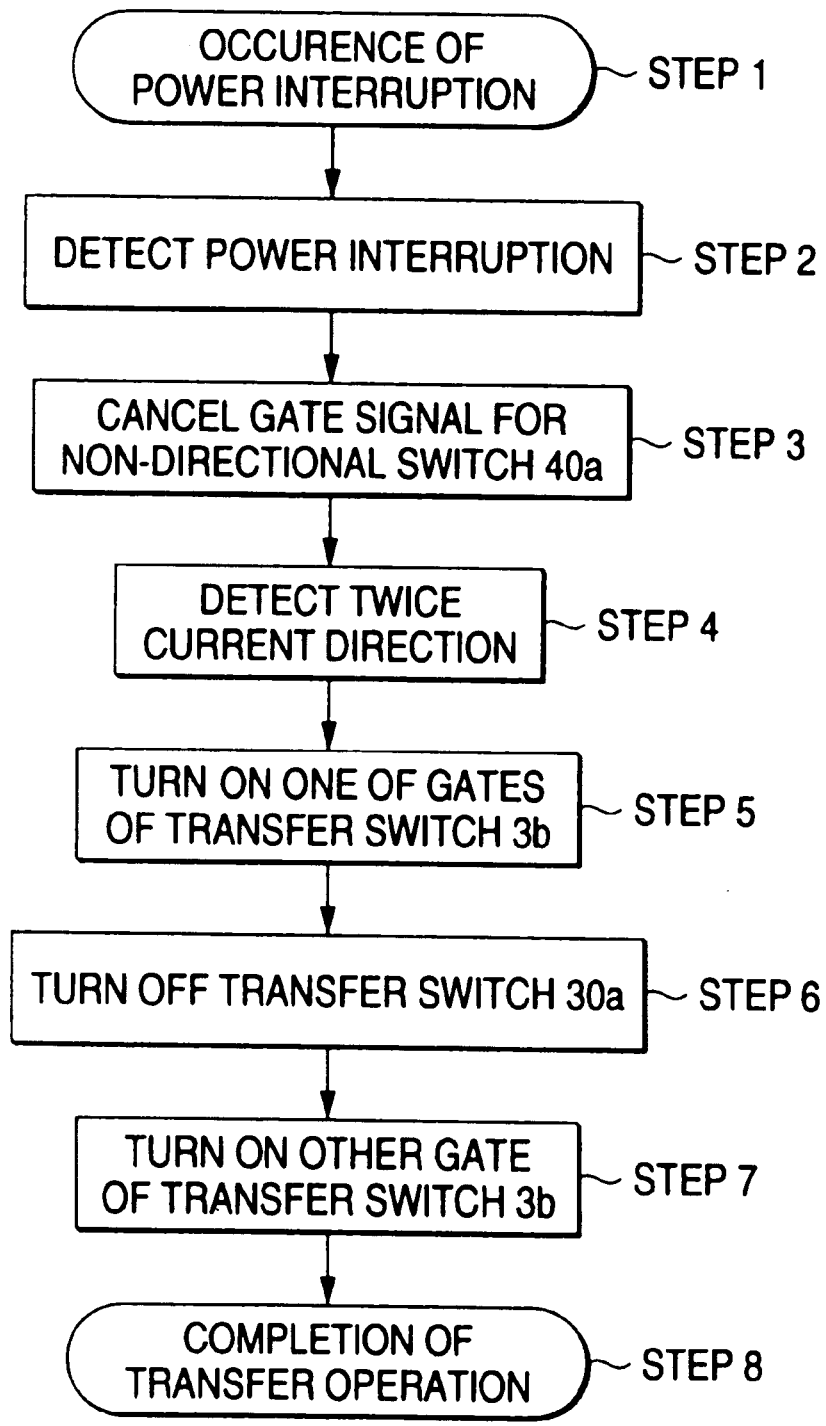
FIG. 8 is a flowchart illustrating the operation of the power transfer device of Embodiment 2.

FIG. 8 is a flowchart showing a procedure of a power transferring operation in the power transfer device of Embodiment 2.

Next, the operation of the power transfer device of Embodiment 2 will be described with reference to FIGS. 7 and 8.

When an abnormality such as a power interruption occurs in the first AC power source 1a (step 1 of FIG. 8), the power interruption detector (abnormality detector) 8 detects the power interruption (abnormality) (step 2 of FIG. 8), the signal switch 6a1 selects the OFF signal on the basis of a power interruption signal (abnormality signal) indicative of the detection, and the gate driver 5a1 cancels the gate signal for the non-directional switch 40a (step 3 of FIG. 8).

The above operation is fundamentally identical with that of the conventional power transfer device shown in FIG. 12.

The embodiment is different from the conventional power transfer device in the following points. Since the non-directional switch 40a (for example, a vacuum switch or a mechanical switch) is used in the first current transfer switch 30a, the loss produced in the normal power supply operation of the first AC power source 1a can be reduced as compared with the case where semiconductor switches are used. Furthermore, it is not required to cool the first current transfer switch 30a, and hence the device can be miniaturized.

After the gate signal for the non-directional switch 40a is cancelled, the current direction detector 10 detects the direction of the current flowing from the first AC power source 1a to the load 2 (step 4 of FIG. 8), for the second time. In accordance with the detected current direction, only the signal switch 6b2 is controlled so as to select the ON signal (step 5 of FIG. 8). In response to the outputs of the signal switches 6b1 and 6b2, the gate drivers 5b1 and 5b2 supply the gate signals to the semiconductor switches 4b1 and 4b2. As a result, the semiconductor switch 4b2 is turned ON.

When the voltage of the second AC power source 1b is higher than that of the load 2, the turning ON of the semiconductor switch 4b2 causes a current to flow from the second AC power source 1b into the load 2. As a result, the current flowing from the first AC power source 1a into the load 2 is cancelled, so that the interruption of the non-directional switch 40a (i.e., the interruption of the first current transfer switch 30a) can be hastened (step 6 of FIG. 8).

Thereafter, the other semiconductor switch 4b1 of the second current transfer switch 3b is turned ON (step 7 of FIG. 8), whereby the power transferring operation from the first AC power source 1a to the second AC power source 1b is completed (step 8 of FIG. 8).

As described above, in the power transfer device of Embodiment 2 shown in FIG. 7, since the non-directional switch 40a is used in the first current transfer switch 30a, the loss produced in the normal power supply operation can be reduced, and the cooling of the first current transfer switch 30a is not necessary or the necessity of performing the cooling is reduced, so that the device can be miniaturized.

In place of the current direction estimator 20 and the ON (conduction) signal generator which are used in Embodiment 1, the current direction detector 10 which has a simple circuit configuration is used. Therefore, the production cost can be reduced.

In Embodiment 2 also, the power transferring operation in the case where an abnormality due to a power interruption of the first AC power source 1a is detected has been described. In a power transfer device of this kind, a similar power transferring operation is required also in abnormalities of a power source such as occurrence of an overvoltage, a phase jump, a frequency abnormality, and phase unbalance. In place of the power interruption detector 8, therefore, overvoltage detector for detecting an overvoltage, phase jump detector for detecting a phase jump, frequency abnormality detector for detecting a frequency abnormality, phase unbalance detector for detecting unbalance of phases, and the like may be disposed. Also in this case, the same effects can be attained.

The case where semiconductor switches such as thyristors are used as current directional switches constituting the second current transfer switch 3b has been described. Switches of any kind may be used as current directional switches constituting the second current transfer switch 3b, as far as the switches have a current directionality, and not be restricted to semiconductor switches.

Embodiment 3

Figure 9:
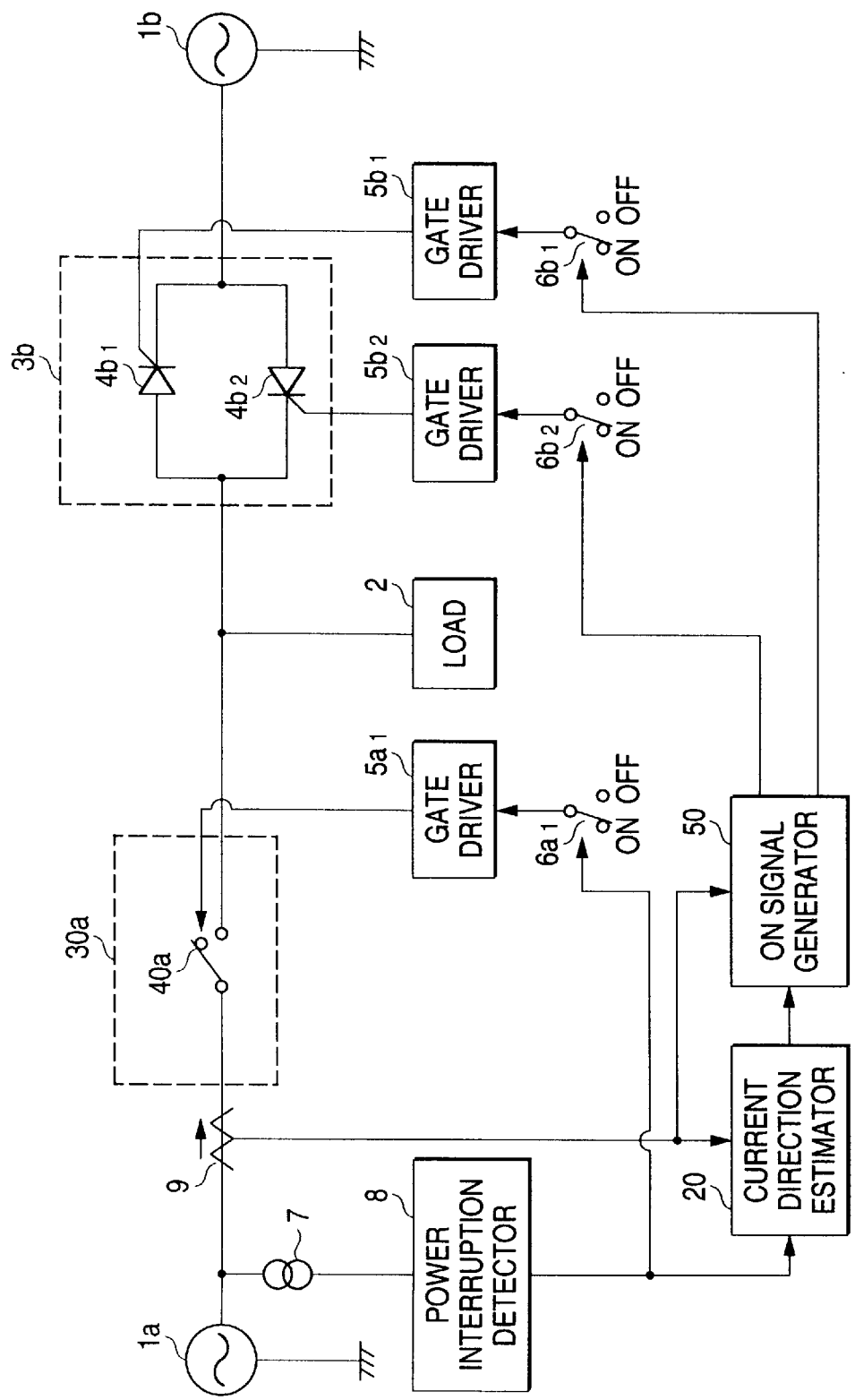
FIG. 9 is a diagram showing the configuration of a power transfer device of Embodiment 3.

FIG. 9 is a diagram showing the configuration of a power transfer device of Embodiment 3.

Figure 10:
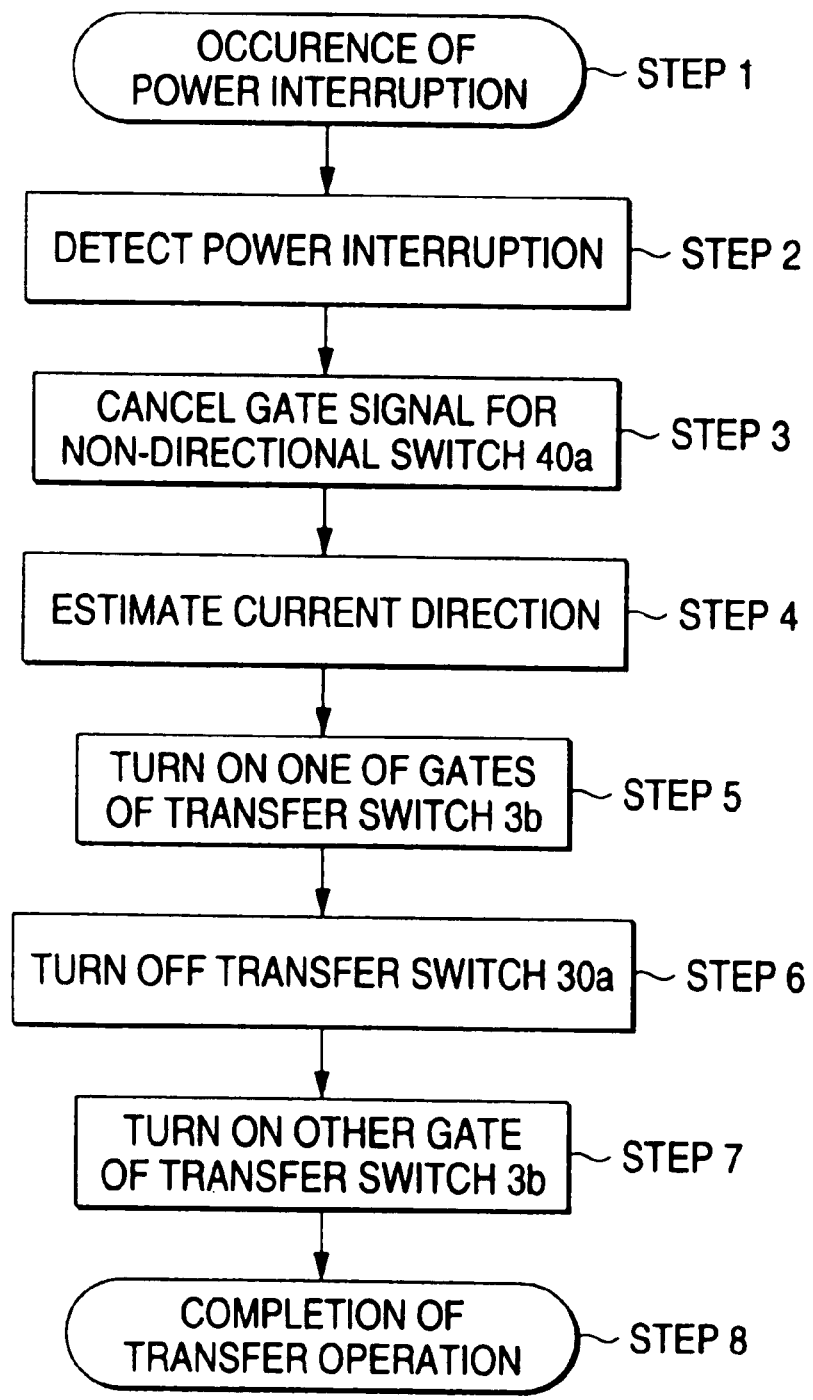
FIG. 10 is a flowchart illustrating the operation of the power transfer device of Embodiment 3.

FIG. 10 is a flowchart showing a procedure of a power transferring operation in the power transfer device of Embodiment 3 of the invention.

The embodiment is different from the power transfer device of Embodiment 1 shown in FIG. 1 in the following points. In place of the first current transfer switch 3a which have a current directionality, and which is configured by the two semiconductor switches which are connected so that their conduction directions are opposed to each other, the first current transfer switch 30a configured by the non-directional switch 40a (for example, a vacuum switch or a mechanical switch) which has been described in Embodiment 2 is used as shown in FIG. 9. Therefore, the loss produced in the normal power supply operation of the first AC power source 1a can be further reduced as compared with Embodiment 1 in which the semiconductor switches are used. Furthermore, it is substantially unnecessary to cool the first current transfer switch 30a, and hence the device can be miniaturized.

Next, the operation of the power transfer device of the embodiment will be described with reference to FIGS. 9 and 10.

When a power interruption (abnormality) occurs in the first AC power source 1a (step 1 of FIG. 10), the power interruption detector (abnormality detector) 8 detects the power interruption (abnormality) (step 2 of FIG. 10), the signal switch 6a1 selects the OFF signal on the basis of the power interruption signal (abnormality detection signal) indicative of the detection, and the gate driver 5a1 cancels the gate signal from the non-directional switch 40a (step 3 of FIG. 10), thereby attaining a state where the non-directional switch 40a can be turned OFF. The above operation is identical with that of the power transfer device of Embodiment 2 described above.

In the power transfer device of Embodiment 3, by using the current direction estimator 20 and the ON signal generator 50 which have been described in Embodiment 1, the current direction at the timing when the gate signal is applied is estimated in the same manner as Embodiment 1 (step 4 of FIG. 10). The signal switch 6b1 selects the OFF signal, and the signal switch 6b2 selects the ON signal. in response to the outputs of the signal switches 6b1 and 6b2, the gate drivers 5b1 and 5b2 supply the gate signals to the semiconductor switches 4b1 and 4b2. As a result, the semiconductor switch 4b2 is turned ON (step 5 of FIG. 10).

The specific configuration and operation of the current direction estimator 20 and the ON signal generator 50 are identical with those of Embodiment 1, and hence their description is omitted.

When the voltage of the second AC power source 1b is higher than that of the load 2, the turning ON of the semiconductor switch 4b2 causes a current to flow from the second AC power source 1b into the load 2.

As a result, the current flowing from the first AC power source 1a into the load 2 is cancelled, so that the interruption of the non-directional switch 40a (i.e., the interruption of the first current transfer switch 30a) can be hastened (step 6 of FIG. 10).

Thereafter, the other semiconductor switch 4b1 of the second current transfer switch 3b is turned ON (step 7 of FIG. 10), whereby the power transferring operation from the first AC power source 1a to the second AC power source 1b is completed (step 8 of FIG. 10).

As described above, in the power transfer device of Embodiment 3 shown in FIG. 9, since the current direction estimator 20 and the ON signal generator are used, the first AC power source 1a can be rapidly interrupted while preventing the first AC power source 1a and the second AC power source 1b from being short-circuited, and the power source can be transferred to the second AC power source 1b, while shortening the time period when the voltage applied to the load 2 is low. Since the non-directional switch 40a such as a vacuum switch or a mechanical switch of a reduced loss due to a flowing current is used in the first current transfer switch 30a, furthermore, the loss due to the first AC power source 1a and produced in the normal power supply operation of the first AC power source 1a can be reduced. Moreover, the cooling is not necessary or the necessity of performing the cooling is reduced, so that the device can be miniaturized.

In Embodiment 3 also, the power transferring operation in the case where an abnormality due to a power interruption of the first AC power source 1a is detected has been described. In a power transfer device of this kind, a similar power transferring operation is required also in abnormalities of a power source such as occurrence of an overvoltage, a phase jump, a frequency abnormality, and phase unbalance. In place of the power interruption detector 8, therefore, overvoltage detector for detecting an overvoltage, phase jump detector for detecting a phase jump, frequency abnormality detector for detecting a frequency abnormality, phase unbalance detector for detecting unbalance of phases, and the like may be disposed. Also in this case, the same effects can be attained.

The case where semiconductor switches such as thyristors are used as current directional switches constituting the second current transfer switch 3b has been described. Switches of any kind may be used as current directional switches constituting the second current transfer switch 3b, as far as the switches have a current directionality, and not be restricted to semiconductor switches.

Embodiment 4

Figure 11:
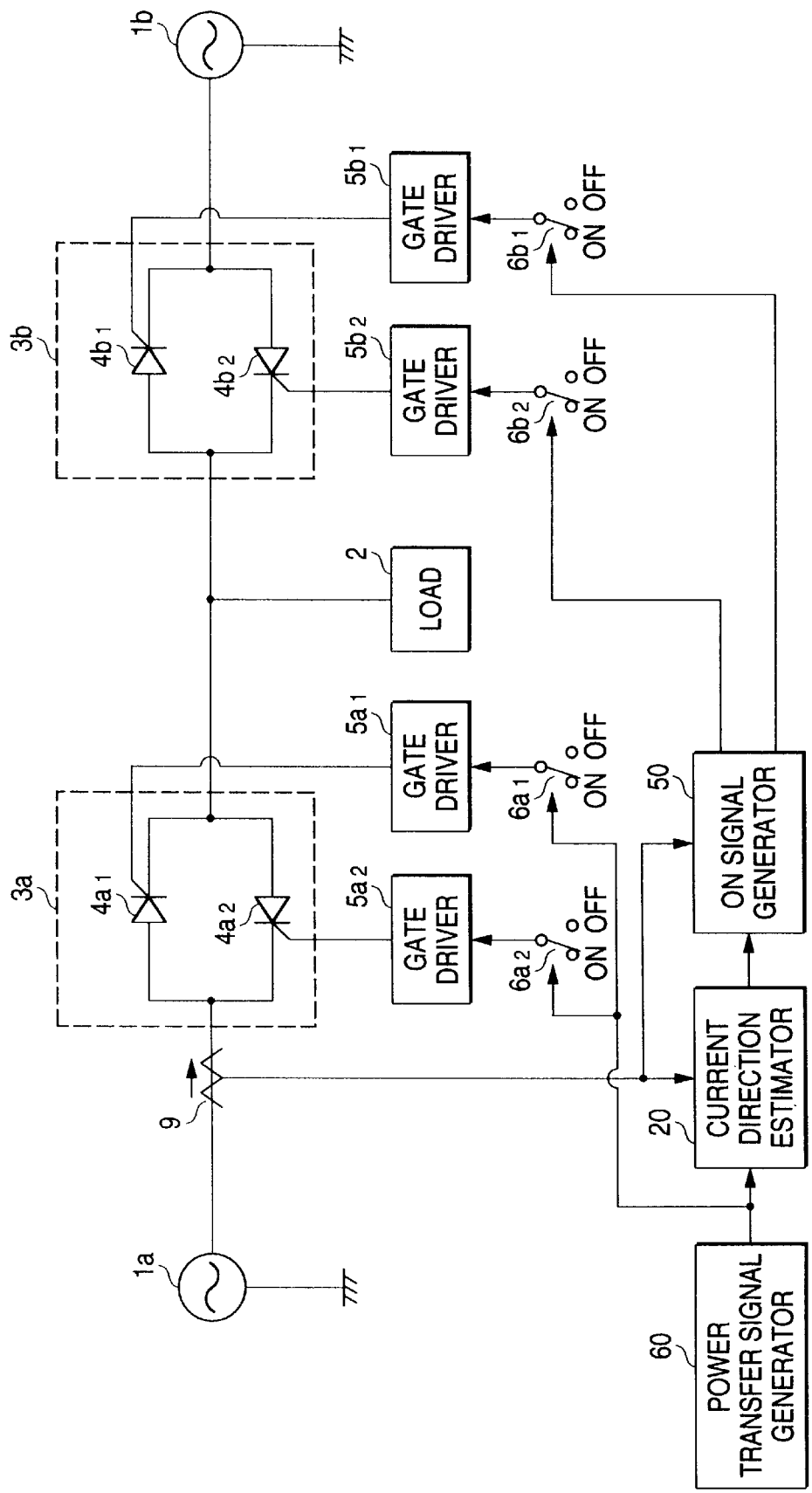
FIG. 11 is a diagram showing the configuration of a power transfer device of Embodiment 4.

FIG. 11 is a diagram showing the configuration of a power transfer device of Embodiment 4. In Embodiments 1 to 3 described above, an abnormality such as a power interruption of the first AC power source 1a is detected by the power interruption detector (abnormality detector) 8, and, in response to the detection signal, the power source is transferred from the first AC power source 1a to the second AC power source 1b which is sound.

By contrast, the embodiment is characterized in that, as shown in FIG. 11, a power transfer signal generator 60 which can generate a transfer signal for the power source by a manual operation or the like is disposed in place of the detector (for example, the power interruption detector 8) for detecting an abnormality of the first AC power source 1a.

In the embodiment, because of the above configuration, the power source can be transferred in the following manner to the second AC power source 1b which is sound, manually and at any time in accordance with the intention of the operator. The gate signals for the semiconductor switches 4a1 and 4a2 having a current directionality and constituting the first current transfer switch (current transferring section) 3a connected between the first AC power source 1a and the load 2 are cancelled. The current direction estimator 20 correctly estimates the current direction at the timing when the gate of the second current transfer switch (current transferring section) 3b is actually turned ON. In the second current transfer switch (current transferring section) 3b connected between the second AC power source 1b and the load 2, the semiconductor switch of the conduction direction along which the current flowing from the first AC power source 1a to the load 2 is cancelled is first turned ON, whereby the first AC power source 1a can be rapidly interrupted while preventing the first AC power source 1a and the second AC power source 1b from being short-circuited, and the power source can be transferred to the second AC power source 1b which is sound, while shortening the time period when the voltage applied the load 2 is low.

FIG. 11 shows the case where power interruption detector (abnormality detector) for detecting an abnormality such as a power interruption of the first AC power source 1a is not disposed. Alternatively, detector for detecting an abnormality of the first AC power source 1a may be additionally disposed in the configuration of FIG. 11.

In the alternative, it is possible to provide a power transfer device which can attain the above-mentioned effects, and which can perform both manual power transfer and automatic power transfer based on the abnormality detection in the first AC power source 1a.

In Embodiment 4 also, semiconductor switches such as thyristors are used as current directional switches constituting the first current transfer switch 3a or the second current transfer switch 3b. Switches of any kind may be used as current directional switches constituting the first current transfer switch 3a or the second current transfer switch 3b, as far as the switches have a current directionality, and not be restricted to semiconductor switches.

The first current transfer switch 3a may be configured by a non-directional switch in the same manner as Embodiments 2 and 3.

The power transfer device of the invention comprises: first current transferring section, connected between a first AC power source and a load, for causing a current supply to the load to be in a conduction state or a non-conduction state; second current transferring section, connected between a second AC power source and the load, for causing a current supply to the load to be in a conduction state or a non-conduction state, the second current transferring section being configured by switches which have opposite conduction directions, respectively, which are connected in parallel, and which have first and second current directionalities, respectively; current detector for detecting a current which is supplied from the first AC power source to the load, and for outputting a detection signal; power transfer signal generator for generating a power transfer signal instructing transfer from the first AC power source to the second AC power source, the power transfer signal setting the first current transferring section to enter the non-conduction state; current direction estimator for, on the basis of output signals of the power transfer signal generator and the current detector, estimating a direction of a current which flows from the first AC power source to the load at a timing when the second current transferring section becomes conductive after an elapse of a preset time period; and conduction signal generator for, on the basis of a result of the estimation of the current direction estimator, first causing one of the switches constituting the second current transferring section and respectively having the first and second current directionalities to be conductive, a conduction direction of the one switch coinciding with a direction along which the current flowing frog the first AC power source to the load is cancelled, and thereafter causing another one of the switches to be conductive. In response to occurrence of any power transfer signal, the current direction estimator correctly estimates the current direction at the timing when a gate of the second current transferring section is actually turned ON, and, on the basis of a result of the estimation, the semiconductor switch of the conduction direction coinciding with a direction along which the current flowing from the first AC power source to the load is cancelled is first turned ON, thereby attaining an effect that the first AC power source is caused to rapidly enter the non-conduction state while preventing the first AC power source and the second AC power source from being short-circuited, and the power source can be transferred to the second AC power source which is sound, while shortening the time period when the voltage applied to the load is low.

The power transfer signal generator of the power transfer device of the invention is power source abnormality detector for detecting an abnormality of the first AC power source, and uses an output signal of the power source abnormality detector as the power transfer signal. Therefore, the device attains an effect that, in response to occurrences of various abnormalities of the first AC power source which has normally operated, the first AC power source is caused to rapidly enter the non-conduction state while preventing the first AC power source and the second AC power source from being short-circuited, and the power source can be transferred to the second AC power source which is sound, while shortening the time period when the voltage applied to the load is low.

The power source abnormality detector of the power transfer device of the invention is power interruption detector for detecting a power interruption of the first AC power source. Therefore, the device attains an effect that, when a power interruption occurs in the first AC power source which has normally operated, the first AC power source can rapidly enter the non-conduction state while preventing the first AC power source and the second AC power source from being short-circuited, and the power source can be transferred to the second AC power source which is sound, while shortening the time period when the voltage applied to the load is low.

The power transfer signal generator of the power transfer device of the invention generates the power transfer signal in response to a manual operation. Even when the power transfer signal is generated in accordance with the intention of the operator, therefore, the current direction estimator correctly estimates the current direction at the timing when the gate of the second current transferring section is actually turned ON, and, on the basis of a result of the estimation, the semiconductor switch of the conduction direction coinciding with a direction along which the current flowing from the first AC power source to the load is cancelled is first turned ON, thereby attaining an effect that the first AC power source is caused to rapidly enter the non-conduction state while preventing the first AC power source and the second AC power source from being short-circuited, and the power source can be transferred to the second AC power source which is sound, while shortening the time period when the voltage applied to the load is low.

The first current transferring section of the power transfer device of the invention is a non-directional switch which produces a reduced loss due to a flowing current. Therefore, the loss in the first AC power source and due to a current from the first AC power source to the load in the normal power supply operation can be reduced, thereby attaining an effect that the cooling of the first current transferring switch is substantially unnecessary, so that the device can be miniaturized.

The power transfer device of the invention comprises: first current transferring section which is connected between a first AC power source and a load, and which consists of a non-directional switch that causes a current supply to the load to be in a conduction state or a non-conduction state; second current transferring section, connected between a second AC power source and the load, for causing a current supply to the load to be in a conduction state or a non-conduction state, the second current transferring section being configured by switches which have opposite conduction directions, respectively, which are connected in parallel, and which have first and second current directionalities, respectively; current detector for detecting a value of a current which is supplied from the first AC power source to the load, and for outputting the current value; power transfer signal generator for generating a power transfer signal instructing transfer from the first AC power source to the second AC power source, the power transfer signal setting the first current transferring section to enter the non-conduction state; and current direction detector for, on the basis of the power transfer signal and an output signal of the current detector, detecting a direction of the current flowing from the first AC power source to the load, and for, on the basis of the detected current direction, first causing one of the switches constituting the second current transferring section and respectively having the first and second current directionalities to be conductive, a conduction direction of the one switch coinciding with a direction along which the current flowing from the first AC power source to the load is cancelled, and thereafter causing another one of the switches to be conductive. Even when the power transfer signal is generated in accordance with the intention of the operator, therefore, the current direction estimator correctly estimates the current direction at the timing when the gate of the second current transferring section is actually turned ON, and, on the basis of a result of the estimation, the semiconductor switch of the conduction direction coinciding with a direction along which the current flowing from the first AC power source to the load is cancelled is first turned ON, thereby attaining an effect that the first AC power source is caused to rapidly enter the non-conduction state while preventing the first AC power source and the second AC power source from being short-circuited, and the power source can be transferred to the second AC power source which is sound, while shortening the time period when the voltage applied to the load is low. Since the current direction detector which has a simple circuit configuration is used, the device attains another effect that the production cost can be reduced.

What is claimed is:

1. A power transfer device comprising:
   a first current transferring section connected between a first AC power source and a load, the first current transferring section switching current flow from the first AC power source to the load;
   a second current transferring section connected between a second AC power source and the load, the second current transferring section switching current flow from the second AC power supply to the load, the second current transferring section including first and second switches having respective current conducting directions, and connected in parallel and in reverse polarity;
   a current detector for detecting a current flow from the first AC power source to the load, the current detector outputting a detection signal;
   a power transfer signal generator for generating a power transfer signal for transfer of the load from the first AC power source to the second AC power source, the power transfer signal setting the first current transferring section to stop current flow from the first AC power source;
   a current direction estimator, responsive to the power transfer signal and the detection signal, estimating direction of a remaining current flow from the first AC power source to the load at a time when the second current transferring section first begins supplying current from the second power source by closing one of the first and second switches; and
   a conduction signal generator, responsive to the direction of the remaining current flow estimated by the current direction estimator, first closing the one of the first and second switches that supplies a current from the second AC power source that cancels the remaining current then flowing from the first AC power source to the load, and, thereafter, closing the other of the first and second switches to, whereby current flow through the first current transferring section is rapidly extinguished and the first and second AC power sources are not short-circuited during switching.

2. The power transfer device according to claim 1, wherein the power transfer signal generator is a power source abnormality detector for detecting an abnormality of the first AC power source, and an output signal of the power source abnormality detector is the power transfer signal.

3. The power transfer device according to claim 2, wherein the power source abnormality detector is a power interruption detector for detecting a power interruption of the first AC power source.

4. The power transfer device according to claim 1, wherein the power transfer signal generator generates the power transfer signal in response to a manual operation.

5. The power transfer device according to claim 1, wherein the first current transferring section includes a non-directional switch.

6. The power transfer device according to claim 1, wherein the first current transferring section includes third and fourth switches having respective opposite current conducting directions and connected in parallel and in reverse polarity.

7. The power transfer device according to claim 6, wherein the power transfer signal generator is a power source abnormality detector for detecting an abnormality of the first AC power source, and an output signal of the power source abnormality detector is the power transfer signal.

8. The power transfer device according to claim 7, wherein the power source abnormality detector is a power interruption detector for detecting a power interruption of the first AC power source.

9. A power transfer device comprising:
   a first current transferring section connected between a first AC power source and a load, the first current transferring section including a non-directional switch switching current flow from the first AC power source to the load and opening only when a current flow through the first current transferring section is zero;
   a second current transferring section connected between a second AC power source and the load, the second current transferring section switching current from the second AC power supply to the load, the second current transferring section including first and second switches having respective current conducting directions, and connected in parallel and in reverse polarity;

a current detector for detecting a current flow from the first AC power source to the load, the current detector outputting a current signal;

a power transfer signal generator for generating a power transfer signal for transfer of the load from the first AC power source to the second AC power source, the power transfer signal setting the first current transferring section to stop current flow from the first AC power source when the current flow is next zero; and a current direction detector, responsive to the power transfer signal and the current signal, detecting a direction of the current flowing from the first AC power source to the load, and, in response to the direction of the current flow detected, first closing one of the first and second switches so that the current flow from the first AC power source to the load is cancelled by the current flow from the second AC power source through the one of the first and second switches closed, hastening opening of the non-directional switch, thereby producing a zero current flow through the non-direction switch, and, thereafter, closing the other of the first and second switches.

* * * * *